US011082285B2

(12) United States Patent
Tucker et al.

(10) Patent No.: US 11,082,285 B2
(45) Date of Patent: Aug. 3, 2021

(54) NETWORK EVENT GROUPING

(71) Applicant: ServiceNow, Inc., Santa Clara, CA (US)

(72) Inventors: Stephen Scott Tucker, Kirkland, WA (US); Qingbin Li, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/572,138

(22) Filed: Sep. 16, 2019

(65) Prior Publication Data
US 2020/0084085 A1    Mar. 12, 2020

Related U.S. Application Data

(63) Continuation of application No. 15/341,718, filed on Nov. 2, 2016, now Pat. No. 10,447,526.

(51) Int. Cl.
*H04L 12/24* (2006.01)
*H04L 29/06* (2006.01)
*H04L 12/26* (2006.01)

(52) U.S. Cl.
CPC .......... *H04L 41/065* (2013.01); *H04L 41/064* (2013.01); *H04L 41/0613* (2013.01);
(Continued)

(58) Field of Classification Search
CPC . H04L 41/06; H04L 41/0604; H04L 41/0613; H04L 41/0631; H04L 41/064;
(Continued)

(56) References Cited

U.S. PATENT DOCUMENTS 5,537,491 A * 7/1996 Mahoney ............... G06K 9/342
                                                            382/218
5,609,122 A   3/1997 Jimmie
(Continued)

OTHER PUBLICATIONS

Sadoddin, Reza, and Ali Ghorbani. "Alert correlation survey: framework and techniques." Proceedings of the 2006 International Conference on Privacy, Security and Trust: Bridge the Gap Between PST Technologies and Business Services. 2006. (Year: 2006).*

(Continued)

*Primary Examiner* — Atta Khan
*Assistant Examiner* — William C McBeth
(74) *Attorney, Agent, or Firm* — Fletcher Yoder PC

(57) ABSTRACT

Systems and methods are disclosed for network event grouping. For example, methods may include generating a graph including vertices and edges, wherein at least one of the vertices is associated with an event type from a set of event types and wherein at least one of the edges is associated with a weight; removing, based on an associated weight and a first threshold, one or more edges from the graph; determining, after removing the one or more edges from the graph, whether the graph is chordal; responsive to determining that the graph is chordal, identifying a connected subgraph within the graph; determining a group of event types to include event types that are associated with vertices in the identified connected subgraph; and transmitting, storing, or displaying data specifying the group of event types.

17 Claims, 9 Drawing Sheets

(52) U.S. Cl.
CPC .......... *H04L 41/142* (2013.01); *H04L 43/067* (2013.01); *H04L 63/1416* (2013.01)

(58) Field of Classification Search
CPC ..... H04L 41/065; H04L 43/04; H04L 43/045; H04L 43/06; H04L 43/067; H04L 41/14; H04L 41/142
See application file for complete search history.

(56) References Cited

U.S. PATENT DOCUMENTS

| | | | |
|---|---|---|---|
| 5,748,098 A * | 5/1998 | Grace | H04L 41/0631 702/181 |
| 5,912,674 A | 6/1999 | Magarshak | |
| 6,023,571 A | 2/2000 | Matsumoto | |
| 6,253,339 B1 * | 6/2001 | Tse | H04L 41/0631 370/216 |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,301,448 B1 | 11/2007 | Usery et al. | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,239,857 B2 | 1/2016 | Trinon | |
| 9,363,252 B2 | 6/2016 | Mueller | |
| 9,535,737 B2 | 1/2017 | Joy | |
| 9,645,833 B2 | 5/2017 | Mueller | |
| 9,792,387 B2 | 10/2017 | George | |
| 9,916,068 B1 * | 3/2018 | Bell | G06F 3/04842 |
| 10,129,276 B1 | 11/2018 | Raviv et al. | |
| 10,691,664 B1 * | 6/2020 | Yap | G06F 16/23 |
| 2002/0118207 A1 | 8/2002 | Jagla | |
| 2010/0172551 A1 * | 7/2010 | Gilley | G06K 9/6215 382/118 |
| 2012/0330636 A1 | 12/2012 | Albou | |
| 2014/0032552 A1 | 1/2014 | Cohen et al. | |
| 2015/0254969 A1 * | 9/2015 | Bishop | H04L 41/0618 340/506 |
| 2017/0070414 A1 * | 3/2017 | Bell | H04L 41/064 |
| 2017/0111245 A1 * | 4/2017 | Ishakian | G06Q 10/0633 |
| 2017/0132306 A1 * | 5/2017 | Brew | G06F 16/24578 |
| 2017/0134240 A1 | 5/2017 | Hevizi et al. | |
| 2017/0294112 A1 | 10/2017 | Kushnir | |
| 2018/0097828 A1 | 4/2018 | Coskun | |
| 2018/0181835 A1 * | 6/2018 | Fluxa Rodriguez | G06K 9/6218 |

OTHER PUBLICATIONS

Pawling, Alec, Nitesh V. Chawla, and Greg Madey. "Anomaly detection in a mobile communication network." Computational and Mathematical Organization Theory 13.4 (2007): 407-422. (Year: 2007).*

Zhang, Shuying, et al. "The study of network security event correlation analysis based on similar degree of the attributes." 2013 Fourth International Conference on Digital Manufacturing & Automation. IEEE, 2013 (Year: 2013).*

Ning et al. "Analyzing Intensive Intrusion Alerts via Correlation." International Workshop on Recent Advances in Intrusion Detection, 2002, pp. 74-94 (Year: 2002).

Ning et al. "Constructing Attack Scenarios through Correlation of Intrusion Alerts." Proceedings of the 9th ACM Conference on Computer and Communication Security, Nov. 18-22, 2002, pp. 245-254 (Year: 2002).

Derhab et al. "Fortifying Intrusion Detection Systems in Dynamic Ad Hoc and Wireless Sensor Networks." International Journal of Distributed Sensor Networks, Dec. 2014 (Year: 2014).

Sy et al. Graph-based Clustering for Detecting Frequent Patterns in Event Log Data, 2016 IEEE International Conference on Automation Science and Engineering (CASE), Aug. 21-24, 2016, pp. 972-977 (Year: 2016).

Wikipedia contributors. "Graph drawing." Wikipedia, The Free Encyclopedia. Wikipedia, The Free Encyclopedia, Nov. 12, 2018. Web. Jan. 30, 2019. (Year: 2018).

Wikipedia contributors. "Graph (discrete mathematics)." Wikipedia, The Free Encyclopedia. Wikipedia, The Free Encyclopedia, Dec. 26, 2018. Web. Jan. 30, 2019. (Year: 2018).

Valeur et al.; "A Comprehensive Approach to Intrusion Detection Alert Correlation"; IEEE Transactions on Dependable and Secure Computing; vol. 1, No. 3, Jul.-Sep. 2004; 26 pages.

Julisch et al.; Mining Alarm Clusters to Improve Alarm Handling Efficiency; ACSAC '01 Proceedings of the 17th Annual Computer Security Applications Conference; IEEE Computer Society Washington, DC USA; 2001 ; 10 pages.

Johnson et al; "A Recursive Model-Reduction Method for Approximate Inference in Gaussian Markov Random Fields", Laboratory for Information and Decision Systems at the Massachusetts Institute of Technology, Date Unknown, downloaded Oct. 17, 2016, http://projects.csail.mil.edu/alemuri/wiki/hmages/3/3e/Jw_rcm07.pdf, 19 pages.

Massara, Guido P. et al.; "Network Filtering for Big Data: Triangulated Maximally Filtered Graph", https://arxiv.org/pdf/1505.02445.pdf, Jul. 16, 2015, 16 pp.

Yoshida, Tetsuya; "A Graph Model for Mutual Information Based Clustering", J Intell Inf Syst 2011) 37:187-216, Springer, Published online: Sep. 12, 2010, 30 pp.

Wikipedia, The Free Encyclopedia; "Chordal Graph", Date Unknown, downloaded Oct. 28, 2016, hllps://enwikipedia.org/wiki/Chordal_graph, 5 pp.

Nolfram Mathworld; "Chordal Graph", The Web's Most Extensive Mathematics Resource, Date Unknown, downloaded Oct. 28, 2016, http://mathworld.wolfram.com/ChordalGraph.hlml, 2 pp.

* cited by examiner

NETWORK EVENT GROUPING

CROSS REFERENCE TO RELATED APPLICATION(S)

This application is a continuation of U.S. patent application Ser. No. 15/341,819, filed Nov. 2, 2016, which is incorporated herein in its entirety by reference.

TECHNICAL FIELD

The present disclosure relates in general to network event grouping.

BACKGROUND

A computing system, such as a cloud computing system, can be configured to provide software based services to a customer using a network of one or more servers configured to execute various programs for delivering the services to client computing devices. Such a system may generate a large number of alerts, such as notifications that a hardware or software component in the cloud computing system requires a change or modification. Such alerts may be generated by and/or consumed by monitoring tools that facilitate detection of the performance and status of network resources, and enable a variety of network maintenance and/or security functions. These alerts may be displayed to and dispositioned and/or actioned by, for example, system operators in a network operations center. Appropriate assignments need to be identified for dispositioning alerts, with consideration given to both technical and security qualifications.

SUMMARY

Disclosed herein are implementations of network event management.

In an implementation, a system is provided for improving efficiency of computing network management. The system may include a memory, a processor, and a network interface. The memory may store instructions executable by the processor to generate a graph including vertices and edges, wherein at least one of the vertices is associated with an event type from a set of event types and wherein at least one of the edges is associated with a weight. The memory may store instructions executable by the processor to remove, based on an associated weight and a first threshold, one or more edges from the graph. The memory may store instructions executable by the processor to determine, after removing the one or more edges from the graph, whether the graph is chordal. The memory may store instructions executable by the processor to, responsive to determining that the graph is chordal, identify a connected subgraph within the graph. The memory may store instructions executable by the processor to determine a group of event types to include event types that are associated with vertices in the identified connected subgraph. The memory may store instructions executable by the processor to transmit, store, or display data specifying the group of event types.

In an implementation, a method is provided for improving efficiency of computing network management. The method may include generating a graph including vertices and edges, wherein at least one of the vertices is associated with an event type from a set of event types and wherein at least one of the edges is associated with a weight. The method may include removing, based on an associated weight and a first threshold, one or more edges from the graph. The method may include determining, after removing the one or more edges from the graph, whether the graph is chordal. The method may include, responsive to determining that the graph is chordal, identifying a connected subgraph within the graph. The method may include determining a group of event types to include event types that are associated with vertices in the identified connected subgraph. The method may include transmitting, storing, or displaying data specifying the group of event types.

In an implementation, a non-transitory computer-readable storage is provided for improving efficiency of computing network management. The non-transitory computer-readable storage medium may include executable instructions that, when executed by a processor, facilitate performance of operations, including generating a graph including vertices and edges, wherein at least one of the vertices is associated with an event type from a set of event types and wherein at least one of the edges is associated with a weight. The operations may include removing, based on an associated weight and a first threshold, one or more edges from the graph. The operations may include determining, after removing the one or more edges from the graph, whether the graph is chordal. The operations may include, responsive to determining that the graph is chordal, identifying a connected subgraph within the graph. The operations may include determining a group of event types to include event types that are associated with vertices in the identified connected subgraph. The operations may include transmitting, storing, or displaying data specifying the group of event types.

In an implementation, a system is provided for improving efficiency of computing network management. The system may include a memory, a processor, and a network interface. The memory may store instructions executable by the processor to identify groups in a graph of event data by iteratively increasing a threshold and removing edges of the graph having a weight less than the threshold until the graph is determined to be chordal. The memory may store instructions executable by the processor to transmit, store, or display data specifying the identified groups.

In an implementation, a method is provided for grouping events generated by a computing environment. The method may include identifying groups in a graph of event data by iteratively increasing a threshold and removing edges of the graph having a weight less than the threshold until the graph is determined to be chordal. The method may include transmitting, storing, or displaying data specifying the identified groups.

In an implementation, a non-transitory computer-readable storage is provided for grouping events generated by a computing environment. The non-transitory computer-readable storage medium may include executable instructions that, when executed by a processor, facilitate performance of operations, including identifying groups in a graph of event data by iteratively increasing a threshold and removing edges of the graph having a weight less than the threshold until the graph is determined to be chordal. The operations may include transmitting, storing, or displaying data specifying the identified groups.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

This document includes disclosure of systems, apparatus, and methods for grouping events that occur in a computing network to facilitate efficient response to those events. For example, events occurring in a computing network may include alerts, reflecting the status or configuration of a network resource, and/or alarms, reflecting security threats to the computing network. Recognizing relationships between different types of events and grouping related events may assist a network administrator responsible for responding to those events to understand large volumes of event data, help identify a structural problem or security weakness in the computing network, or otherwise facilitate efficient response to events.

Implementations are described for identifying useful groups of related event types based on historical event data and using those groups to organize information about current incoming events for presentation to a user (e.g., a network administrator). For example, FIG. 2B depicts an example two-part approach for (1) determining groups of related event types based on historical event data and (2) applying those groups of event types to format reports of events occurring in a monitored event stream. The approach can further include using the historical data and/or the groups of event types to quality test the groups of event times.

Figure 3:
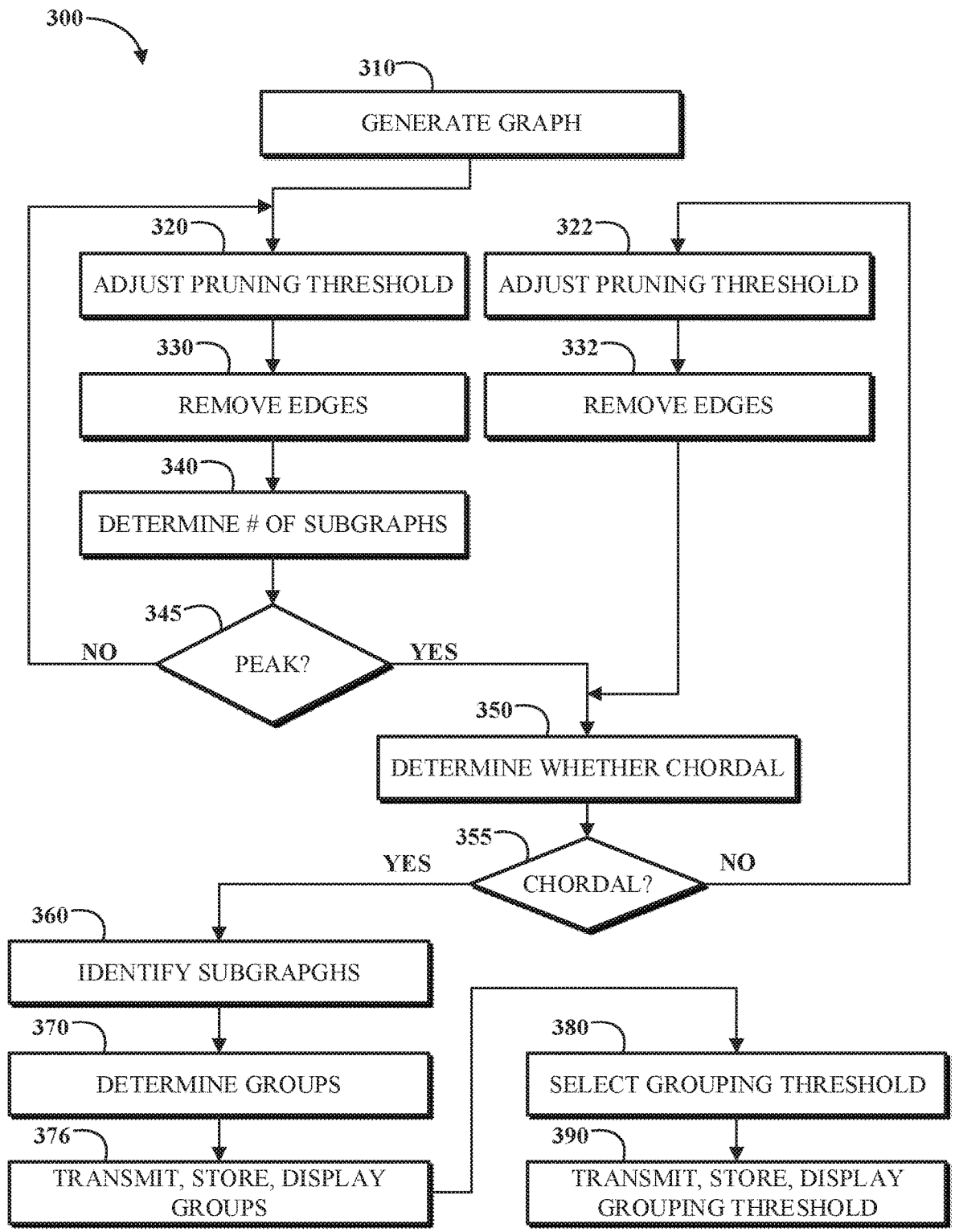
FIG. 3 is a logic flowchart illustrating an example of a technique for determining groups of related event types.
Figure 4:
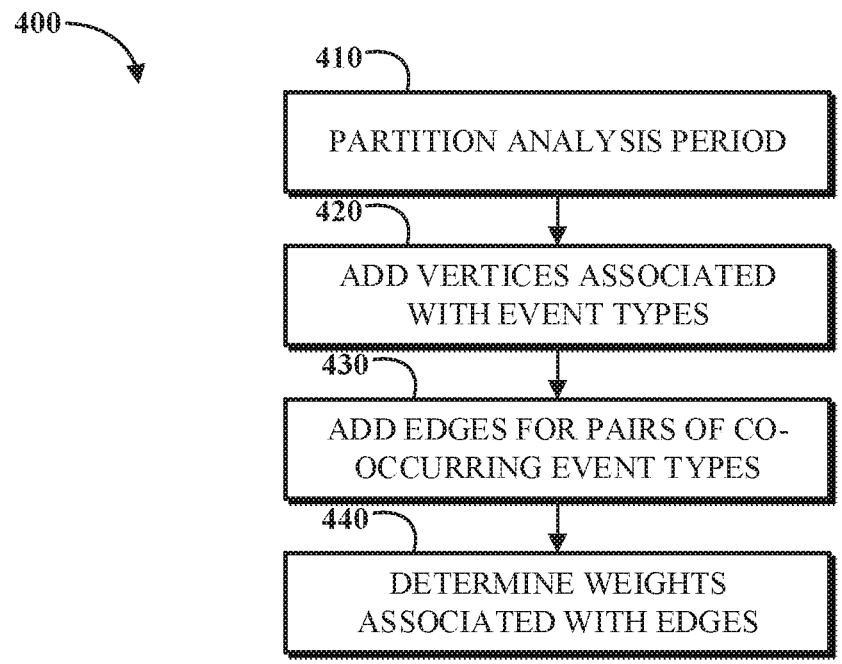
FIG. 4 is a logic flowchart illustrating an example of a technique for generating a graph based on historical event data.

The first part may be implemented, for example, using techniques such as those described in FIGS. 3 and 4. In the first part of the system, events may be classified into event types, and a graph may be generated based on historical event data from a computing network. Edges of the graph may reflect relationships between different event types associated with vertices of the graph. In some implementations, edges of the graph may assigned a weight based on an estimate of mutual information between events of two types. For example, mutual information may be estimated based on rates of co-occurrence for two types of events in historical event data. These weights may reflect the significance of a relationship between the two event types corresponding to the two nodes connected by the edge associate with a weight. This graph may be used to determine groups of related event types based on historical event data represented in the graph.

A graph of the event data may be pruned by removing edges with weights below a pruning threshold, which may filter out noise and/or insignificant relationships in the event data. After the graph has been sufficiently pruned, connected subgraphs that remain may reflect groups of strongly related event types. For example, a group of event types may be determined as a set of event types associated with the vertices of a connected subgraph.

A useful pruning threshold may be determined, which may remove most insignificant groupings while leaving many significant groupings intact. In some implementations, the graph is pruned until the graph becomes chordal. For example, a pruning threshold may be determined by iteratively increasing a pruning threshold and testing whether the resulting graph is chordal. A threshold corresponding to a transition from a non-chordal to a chordal state for the graph may be selected as the appropriate pruning threshold for identifying groups of related events. For example, connected subgraphs in the graph resulting from the application of the selected pruning threshold may be used to identify groups of significantly related event types. For example, the first part may use a pruning threshold corresponding to a transition of the graph to a chordal state to determine groups of related event types.

Figure 5:
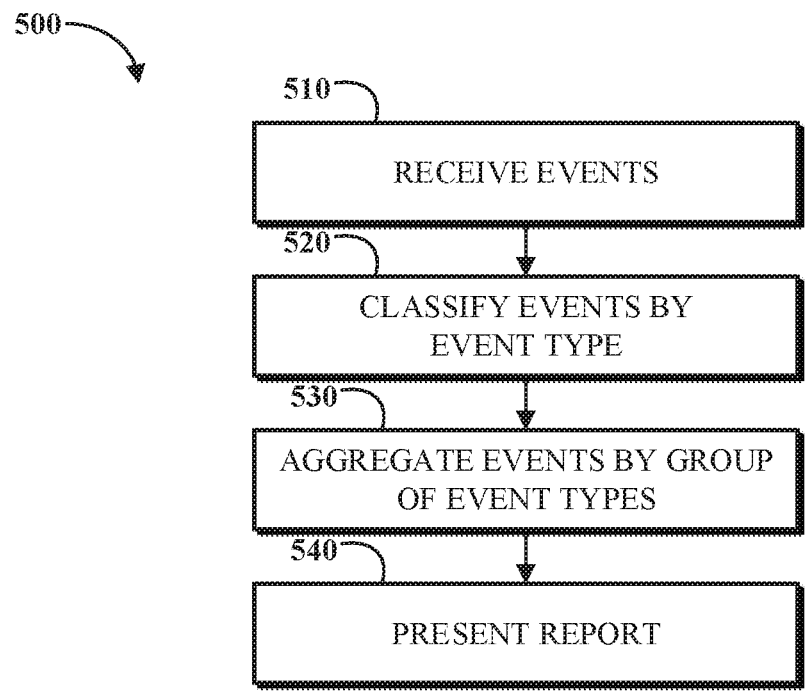
FIG. 5 is a logic flowchart illustrating an example of a technique for presenting a report regarding received events based in part on groups of event types.

The second part may be implemented, for example, using techniques such as those described in FIG. 5. Once groups of related event types have been determined based on historical event data, they may be saved and/or passed to the second part that may apply those groups of event types to aggregate event data (e.g., new event data from a network being monitored). For example, received events may be classified by event type and aggregated by group of event types to organize a potential large flow of event data. The aggregated event data may be presented to a user (e.g., a network administrator), which may facilitate efficient monitoring and/or response to received events.

In some implementations, proposed groups of event types may be further evaluated using group quality metrics derived from historical event data. Groups with metrics (e.g., scores) below another threshold for the metric may be removed from a list of groups used in a system for processing new event data to facilitate response to those events. For example, the approach may include testing groups of event types for quality using quality metrics and removing groups of event types with poor quality metrics.

Figure 1:
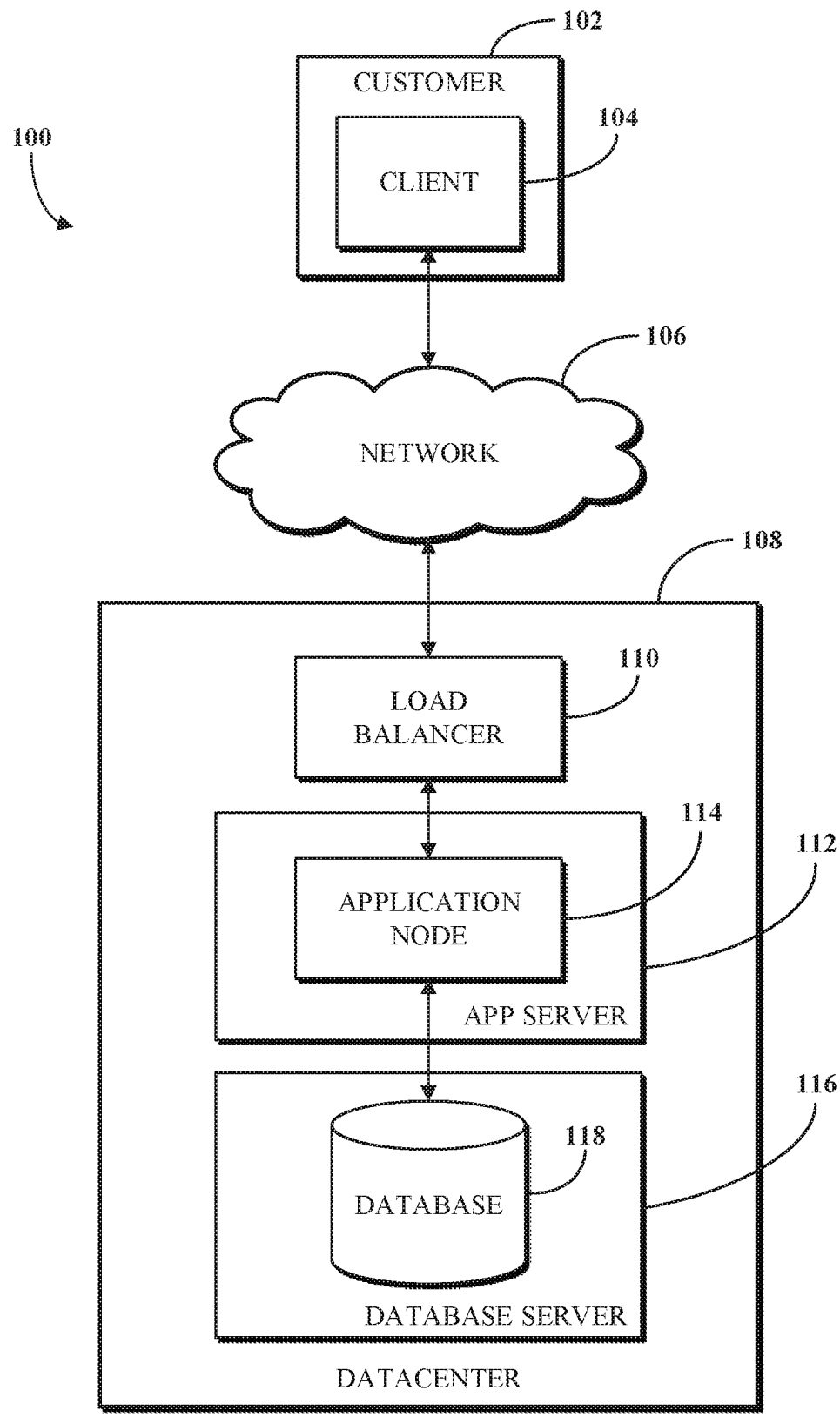
FIG. 1 is a diagram of an example of an electronic computing and communications system.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. As used herein, the term "application" can include, but is not limited to, applications, programs, instances, processes, threads, services, plugins, patches, application version upgrades, and/or any other identifiable computing unit capable of accessing or interacting, directly and/or indirectly, with a database. The system 100 can include any number of customers and/or clients and/or can have a configuration of customers and/or clients than different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers than different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108 and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can be comprised of a plurality of configuration items (CIs). ACI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OM) can represent object identifiers of objects or elements in the MIB.

In some implementations, one or more databases (e.g., the current database 118), tables, other suitable information sources, and/or portions or combinations thereof, can be stored, managed, or otherwise provided by one or more of the elements of the system 100 other than the database server 116, such as the client 104 and/or the application server 112.

Some or all of the systems and methods described herein can operate and/or be executed on or by the servers associated with the system 100. For example, an update for an application executed on the application node 114 can include updating and/or upgrading the current database 118. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved.

Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database, and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2A:
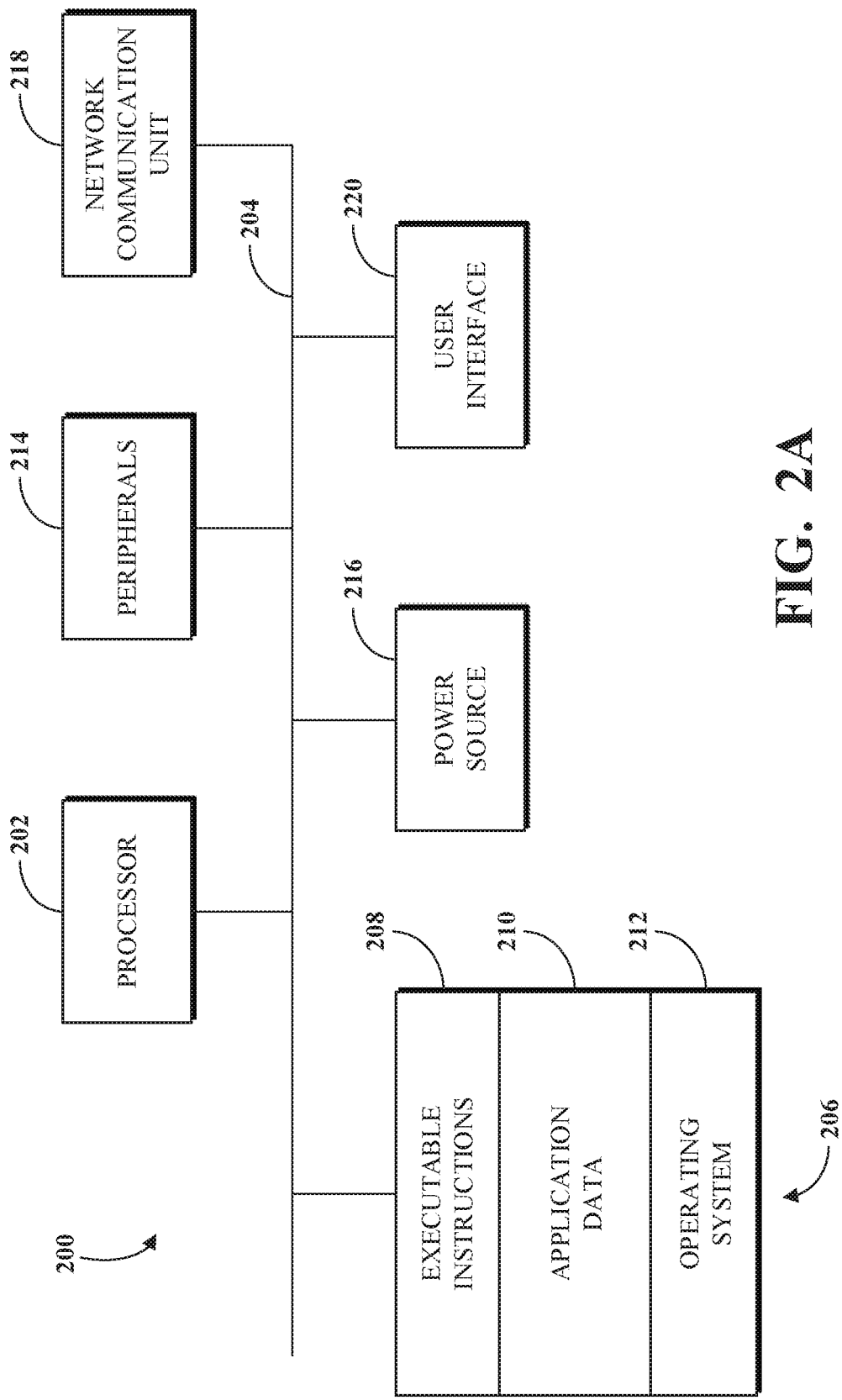
FIG. 2A is a block diagram of an example internal configuration of a computing device of the electronic computing and communications system shown in FIG. 1.
Figure 2B:
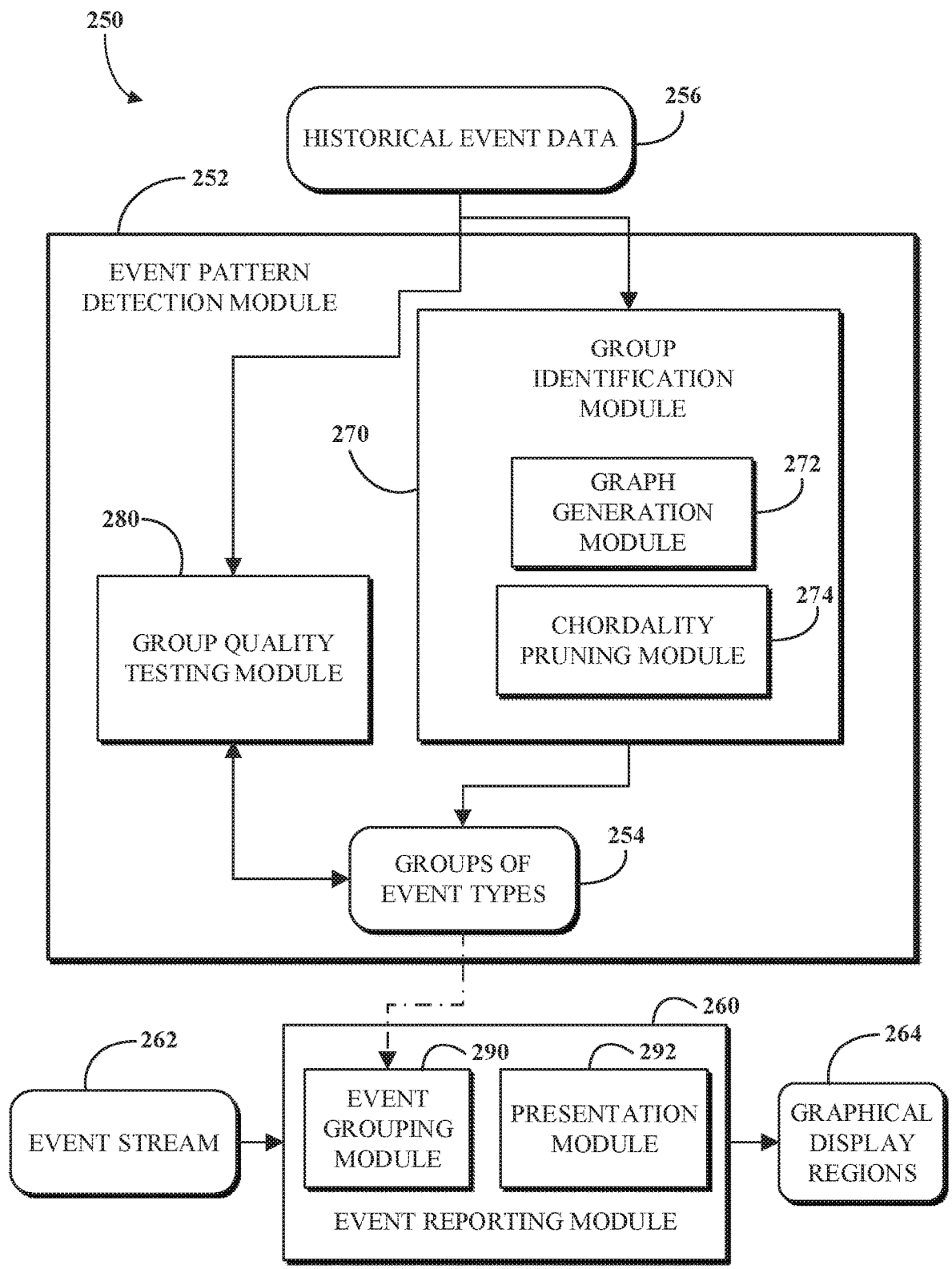
FIG. 2B is a block diagram of an example modular configuration of a computing system for determining groups of related event types and presenting reports regarding received events based in part on groups of event types.

FIG. 2A generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to: identify related requested modifications to a database; generate a batch document including combined, related requested modifications; convert the combined, related requested modifications into a single query; and apply the single query to update a database, such as the current database 118. The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®, an operating system for a small device, such as a smart phone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

In some implementations, a client and/or server can omit the peripherals 214. The operations of the processor 202 can be distributed across multiple machines, which can be coupled directly or across a local area or other type of network. The memory 206 can be distributed across multiple machines, such as network-based memory or memory in multiple machines performing the operations of clients and/or servers. Although depicted here as a single bus, the bus 204 can be composed of multiple buses, which can be connected to one another through various bridges, controllers, and/or adapters.

FIG. 2B is a block diagram of an example modular configuration of a computing system 250 for determining groups of related event types and presenting reports regarding received events based in part on the groups of event types in an electronic computing and communications system, such as the system 100 of FIG. 1. The system 250 may be implemented using computing devices, such as the systems, modules, and devices described with respect to FIGS. 1, 2A, and 2B. The system 250 may be implemented, for example, by executing a machine-readable program or other computer-executable instructions, such as instructions or programs described according to JavaScript, C, or other such instructions. The steps, or operations, performed by system 250 or any other method, process, or algorithm described in connection with the implementations disclosed herein can be implemented directly in hardware, firmware, software executed by hardware, circuitry, and/or a combination thereof.

The computing system 250 has two parts. The first part is the event pattern detection module 252 that determines groups of event types 254 based on analysis of historical event data 256, where events of event types included in a group may be related to one another in a way that is useful for a network administrator to recognize. The second part is the event reporting module 260 that uses the groups of event types 254 from the event pattern detection module 252 to aggregate events arriving in an event stream 262 by the groups of event types 254 and present the aggregated information about the incoming events, in one or more graphical display regions 264, to a user (e.g., a network administrator for a network that generates the event stream 262). Presenting the information about the incoming events in a format that is aggregated by groups of related events may facilitate efficient monitoring and response to the incoming events in the event stream 262.

The historical event data 256 may specify events that have occurred in one or more computing networks during an analysis period (e.g., a day, a week, a month, or a year). Individual events may be associated with a time when the event occurred. Individual events may be classified as being of an event type from a set of event types. For example, an event type may correspond to all alerts from particular network resource (e.g., a web server). For example, an event type may correspond to all alerts concerning memory usage from any network resource. For example, an event type may correspond to all alerts concerning processor usage from particular network resource (e.g., an e-mail server). For example, an event type may correspond to all alarms from particular security service (e.g., a distributed threat analytics engine). For example, an event type may correspond to all alarms concerning potential denial of service attacks. Events of event types that are related to one another may co-occur (e.g., within a short time interval) at high rates over the analysis period. Thus rates of co-occurrence between events of different event types may be used to estimate and/or identify potentially useful relationships among different event types.

The event pattern detection module 252 includes a group identification module 270 that processes the historical event data 256 to determine one or more groups of event types 254. For example, the group identification module 270 may implement the technique 300 described below in relation to FIG. 3 to determine the groups of event types. The groups of event types 254 determined by the event pattern detection module 252 may be stored for later use and/or passed to the event reporting module 260 or another system for application to event data.

The group identification module 270 includes a graph generation module 272 that generates a graph based on the historical event data 256. For example, the graph generation module 272 may implement the technique 400 described below in relation to FIG. 4 to generate the graph. The graph may include vertices that corresponding to event types. The graph may include edges between vertices corresponding to pairs of event types for which events of the two event types have co-occurred during the analysis period. A weight may be associated with an edge, where the weight corresponds to an estimate, based on the historical event data 256, of the significance of the relationship between events of the pair of event types corresponding to the edge. For example, a weight associated with an edge of the graph may be an estimate of the mutual information between events of the two event types corresponding to the edge.

The group identification module 270 includes a chordality pruning module 274 that processes the graph of the historical event data 256 to determine useful groups of event types 254. Edges with weights below a pruning threshold are removed from the graph, thus filtering out less significant relationships between event types. After the pruning operation, sets of vertices that are still connected by the remaining edges may be identified as corresponding to the groups of event types 254. For example, a group of event types may include the event types corresponding to the respective vertices in a connected subgraph of the pruned graph that includes at least two vertices. But the question arises, what should the pruning threshold be in order to identify useful groups of event types. Setting the pruning threshold too low could result in too many insignificant groups and/or groups that are too large and include event types that are very weakly related if at all. Setting the pruning threshold too high could result in too few groups to meaningfully cover the set of event types and/or ignore significant relationships among event types that were reflected in the historical event data 256. A solution to this problem is to use a test of whether or not the pruned graph is chordal as the pruning threshold is adjusted over a reasonable range to select a grouping threshold, i.e., the pruning threshold that is applied to determine the group of event types 254. Groups of event types 254 resulting from using a pruning threshold corresponding to a transition of the graph between a non-chordal and a chordal state may have desirable properties and be useful to users (e.g., network administrators) for organizing large volumes of future incoming events.

The group identification module 270 may also include a group quality testing module 280. For example, the group quality testing module 280 may implement the technique 600 described below in relation to FIG. 6 to test the groups of event types 254 determined by the group identification module 270. For example, the groups of event types 254 may be applied to the historical event data 256 to determine certain performance metrics for the respective groups of event types 254. For example, the performance metrics may reflect hit rates and/or coverage of the set of event types. The performance metrics may be used to evaluate the quality of a group of event types. In some implementations, a group of event types with poor performance metrics may be removed from the groups of event types 254 before the groups of event types 254 are passed to the event reporting module 260 for use with live event data from the event stream 262.

The event reporting module 260 uses the groups of event types 254 determined by the event pattern detection module 252 to organize event information from the event stream 262 for events occurring within a monitoring period (e.g., the last 10 minutes, the last hour, or the last 24 hours) for presentation to a user (e.g., a network administrator) to facilitate efficient monitoring of and/or response to these new events. For example, the event reporting module 260 may implement the technique 500 described below in relation to FIG. 5 to present a report regarding received events from the event stream 262, where the report is based in part on groups of event types 254. The event reporting module 260 includes an event grouping module 290 that aggregates the events from the event stream 262 by group from the group of event types 254. Organizing the event data in this manner may help users to efficiently sift through large volumes of event data, recognize patterns in the event data, and/or anticipate what types of events may be more likely to occur in the near future. The event reporting module 260 includes a presentation module 292 generates one or more graphical display regions 264 that are formatted based in part on the groups of event types 254 for presentation to a user. For example, a graphical display region similar to the graphical display region 810 of FIG. 8 may be generated.

The event pattern detection module 252 and the event reporting module 260 may be implemented on the same computing device or on different computing devices. For example, the event pattern detection module 252 may be implemented on the application server 112 and the event reporting module 260 may be implemented on the client 104. For example, the event pattern detection module 252 and the event reporting module 260 may both be implemented on the client 104. For example, the event pattern detection module 252 and the event reporting module 260 may both be implemented on the application server 112.

Although the example system 250 has been shown a two-part system for clarity, the techniques described herein can be implemented in a variety of combinations and for a variety of different applications. For example, the groups of event types 254 determined by the event pattern detection module 252 may be used to aggregate event data that is input to an automated system for responding to events. For example, event data that has been aggregated using the groups of event types 254 may be used to train a machine learning model and/or input to the machine learning model that takes automatic action in response to the aggregated event data. For example, alerts from a computing network may be aggregated using the groups of event types 254 and input to system that activates auto-remediation measures in response to the alerts. In some implementations, the group quality testing module 280 may be implemented as part of the event reporting module 260 instead of as part of the event pattern detection module 252. In some implementations, the group quality testing module 280 may be omitted. In some implementations, the event reporting module 260 may be omitted.

FIG. 3 is a flowchart of a technique 300 for determining groups of related event types in an electronic computing and communications system, such as the system 100 of FIG. 1.

In some implementations, the technique 300 can be executed using computing devices, such as the systems, modules, and devices described with respect to FIGS. 1, 2A, and 2B. In some implementations, the technique 300 can be performed, for example, by executing a machine-readable program or other computer-executable instructions, such as instructions or programs described according to JavaScript, C, or other such instructions. The steps, or operations, of the technique 300 or any other method, process, or algorithm described in connection with the implementations disclosed herein can be implemented directly in hardware, firmware, software executed by hardware, circuitry, and/or a combination thereof.

In some implementations, the technique 300 can include generating at operation 310 a graph including vertices and edges. For example, the graph may be generated at operation 310 based on historical event data from a computing network. In some implementations, events described in event data may include alerts reflecting a status of a network resource. For example, an alert may include an identifier (e.g., a name or a MAC address) for a configuration item (e.g., a model of a resource in a computing network) and an identifier of a metric (e.g., processor usage). In some implementations, events described in event data may include alarms reflecting a network security threat. For example, an alarm may include an identifier (e.g., a name or IP address) of a source of a security threat and an identifier (e.g., a name or a MAC address) of a target of the security threat (e.g., a server in a computing network under management).

Vertices of the graph may be associated with an event type from a set of event types. For example, the set of event types may be used to classify events reflected in event data. In some implementations, edges of the graph are associated with a weight. A relationship between events of event types can be indicated by an edge between vertices that has an associated weight. A weight, which is associated with an edge that connects a vertex associated with a first event type to a vertex associated with a second event type, may be determined based on an estimate of mutual information between events of the first event type and events of the second event type. For example, the technique 400, described in relation to FIG. 4, may be applied to determine weights associated with edges in the graph. In some implementations, weights may be determined based on estimates of conditional probability of events of event types associated with the corresponding connected vertices. In some implementations, weights may be determined based on estimates of correlation of events of event types associated with the corresponding connected vertices. The absence of an edge between vertices can indicate that there is no known relationship between the event or event types of those vertices, that there is a weight of zero, that there is no weight, or a combination thereof.

A pruning threshold can be used to remove edges that have an associated weight, based on a comparison of that weight to the threshold. The removal of edges can, depending on the graph, result in a number of connected subgraphs (e.g., a connected subgraph can be a subset of vertices of the graph that are connected to each other by edges but that are disconnected from other vertices of the graph). A grouping threshold is a pruning threshold that is used to remove edges from a graph and for which connected subgraphs in the resulting graph are used to determine at operation 370 groups of events associated with the vertices of the respective connected subgraphs. In an implementation, the determination of a grouping threshold can be a two-stage process where a first stage determines a range of pruning thresholds to consider and a second stage determines the grouping threshold based on detecting chordality of the graph for a pruning threshold within the range of pruning thresholds considered. This two-stage process may be used to enhance the use of chordality as a test for identifying the grouping threshold (e.g., because at low thresholds, the entire graph may be connected without subgraphs and may be chordal). In implementations such as the one described below, the first stage can be implemented using operations such as operations 320, 330, 340, and 345, and the second stage can be implemented using operations such as operations 322, 332, 350, and 355.

A pruning threshold may be adjusted at operation 320, and edges, having an associated weight less than the pruning threshold, may be removed from the graph at operation 330. For example, a pruning threshold may be initialized to a low value (e.g., zero), which may result in retaining most or all edges in the graph when edges below the threshold are removed at operation 330. In some implementations, the pruning threshold may be iteratively increased at operation 320 as one or more tests are performed on the graph after removal at operation 330 of edges in order to search for a useful pruning threshold. For example, a pruning threshold may be adjusted at operation 320 by increasing the threshold in increments, which can, for example, be equally spaced, variably spaced, or a combination thereof. In some implementations, a pruning threshold may be adjusted at operation 320 by an amount that depends on the distribution of weights for edges in the graph. For example, the pruning threshold may be increased enough to remove at operation 330 at least some minimum number or percentage of edges (e.g., at least 10 edges or at least 1% of remaining edges) in the most recent version of the graph.

In some implementations, the weights may be inversely proportional to the relationship between the event types associated with the respective connected vertices. For example, the weights may be determined as one minus an estimate of the mutual information between events of the event types associated with the respective connected vertices. In such an implementation, a pruning threshold may be applied by removing edges with an associated weight that is greater than the pruning threshold, and the pruning threshold may be adjusted at operation 320 by iteratively decreasing the pruning threshold. Other types of weightings or weighting scales or combinations thereof are possible. For example, weights associated with edges need not be confined to the scale of zero to one.

In some implementations, the graph may be stored in a database and include a list of the edges that is sorted or indexed by their associated weights. For example, a binary search of this sorted or indexed list of edges may be utilized to efficiently apply a pruning threshold by partitioning the set of edges into edges with a weight above the pruning threshold and edges with a weight below the pruning threshold.

A count of connected subgraphs in the resulting graph may be determined at operation 340. A connected subgraph may include at least two vertices and may be disconnected from other vertices in the graph. A subgraph is connected when there is a path (i.e., of edges that have not been removed from the graph) between every pair of vertices within the subgraph. A subgraph that is not connected is disconnected. A subgraph is disconnected from a vertex if there is no path (i.e., of edges that have not been removed from the graph) from the vertex to the vertices in the subgraph. In some implementations, only connected subgraphs that include at least two vertices and are disconnected from other vertices in the graph are counted.

The count of connected subgraphs is checked at operation 345 to determine whether the count of connected subgraphs corresponds to a peak over variation of the pruning threshold. For example, as the pruning threshold is increased at operation 320 over a range of values and more edges are removed at operation 330 from the graph, the count of connected subgraphs may change or evolve (e.g., as described in relation to FIG. 9). For example, the count of connected subgraphs as a function of the pruning threshold may have one or more peaks. It may be desirable, when searching for grouping threshold, to consider pruning thresholds within a range chosen based on a pruning threshold corresponding to a peak (e.g., searching a range of pruning thresholds that are greater than or equal to a pruning threshold corresponding to a peak). In some implementations, a peak may be detected by comparing consecutive counts of connected subgraphs as the pruning threshold is iteratively increased at operation 320 to check at operation 345 for a decrease in the count of connected subgraphs. For example, the count of connected subgraphs may be compared to a previous count of connected subgraphs from an earlier iteration and if the latest count is less than the previous count, then the current count and the pruning threshold applied at operation 330 to achieve it may be determined at operation 345 to correspond to a peak. In some implementations, a peak may be detected based on analysis of longer windows of consecutive counts of connected subgraphs as the pruning threshold is iteratively increased at operation 320 to check at operation 345 for a rise followed by a decrease in the count of connected subgraphs. For example, a sequence of counts of connected subgraphs may be filtered and/or analyzed to determine at operation 345 if the sequence of counts in a window generally rises and then falls. If the sequence of counts rises and then falls, a count from within the window and the pruning threshold applied at operation 330 to achieve it may be determined at operation 345 to correspond to a peak.

If at operation 345 the count of connected subgraphs does not correspond to a peak, then adjustment at operation 320 of the pruning threshold and removal at operation 330 of edges may continue until the count of connected subgraphs corresponds to a peak. Checking that the number of connected subgraphs has evolved to at least a first peak before testing whether the graph is chordal may be helpful, because, for example, a fully connected or nearly fully connected graph that may result from an initial low pruning threshold may be trivially chordal. For example, all cycles of four or more may have chords, just because there are so many edges with low associated weights, which may indicate weak relations between event types associated with the connected vertices. It may be beneficial to prune the graph to achieve a reasonable count of connected subgraphs as a precondition of determining at operation 350 whether the graph is chordal.

If at operation 345 the count of connected subgraphs corresponds to a peak, then whether the graph is chordal is determined at operation 350. The graph is chordal if all cycles of four or more vertices have a chord, which is an edge that is not part of the cycle but connects two vertices of the cycle. In some implementations, whether the graph is chordal or not may be determined at operation 350 by searching for a perfect elimination ordering of the graph. For example, a lexicographic breadth-first search may be performed to determine at operation 350 whether a perfect elimination ordering exists for the graph and thus whether the graph is chordal. For example, a module for implementing the determination at operation 350 may use software packages such as NetworkX and JGraph that implement a chordal test in graph handling libraries.

If at operation 355 the graph is not chordal, then adjustment at operation 322 of the pruning threshold and removal at operation 332 of edges, having a weight less than the pruning threshold, from the graph may continue until the graph is determined at operation 350 to be chordal. The pruning threshold may be adjusted at operation 322 within a range determined based in part on a pruning threshold determined at operation 345 to correspond to a peak in the count of connected subgraphs. For example, the pruning threshold may start at a value corresponding to a peak of the count of connected subgraphs and be iteratively increased from there. In some implementations, a pruning threshold may be adjusted at operation 322 by increasing the threshold in increments, which can, for example, be equally spaced, variably spaced, or a combination thereof. In some implementations, a pruning threshold may be adjusted at operation 322 by an amount that depends on the distribution of weights for edges in the graph. For example, the pruning threshold may be increased enough to remove at operation 332 at least some minimum number or percentage of edges (e.g., at least 10 edges or at least 1% of remaining edges) in the most recent version of the graph. In some implementations, the pruning threshold may be adjusted at operation 322 in a pattern to effect a binary search over a range of pruning threshold values (e.g., from a value corresponding to a peak count of connected subgraphs to a maximum value) to find a value of the pruning threshold that closely corresponds to a transition of the graph from non-chordal to chordal.

If at operation 355 the graph is chordal, then one or more connected subgraphs in the graph may be identified at operation 360. In some implementations, only connected subgraphs that include at least two vertices and are disconnected from other vertices in the graph are identified at operation 360.

One or more groups of event types may be determined at operation 370 based on an identified connected subgraph from the graph. In some implementations, a group of event types is determined at operation 370 to include event types that are associated with the two or more vertices in one of the identified connected subgraphs.

One or more of the groups determined at operation 370 may be transmitted, stored, or displayed at operation 376. For example, data specifying the identified groups may be transmitted, for example, via a network interface (e.g., the network communication unit 218) to a server device (e.g., the client 104) that will apply the groups to new event data from a computing network to facilitate response to those events. For example, data specifying the identified groups may be stored, for example, in a memory (e.g., the memory 206) for later application to new event data from a computing network to facilitate response to those events. For example, data specifying the identified groups may be displayed, for example, in a user interface (e.g., the user interface 220) as part of a report regarding new event data or to analyze relationships among event types and help identify structural problems or security weaknesses in a computing network.

A grouping threshold may be selected at operation 380. For example, responsive to the graph being determined at operation 350 to be chordal, the grouping threshold may be selected at operation 380 to be the edge pruning threshold used (e.g., to remove at operation 330 edges) that resulted in the graph becoming chordal. The selected grouping threshold may be used to determine at operation 370 groups of event types from the current graph as described. In some implementations, the selected grouping threshold may be used to determine groups of event types to analyze other graphs based on different historical event data. For example, the grouping threshold selected at operation 380 may be transmitted, stored, or displayed at operation 390 for the purpose of analyzing other sets of event data to identify or determine groups of related event types.

Although the technique 300 is shown as a series of operations for clarity, implementations of the technique 300 or any other method, technique, process, and/or algorithm described in connection with the implementations disclosed herein can be performed in various orders and/or concurrently. Additionally, operations in accordance with this disclosure can be performed with other operations not presented and described herein. In an example, if an iteratively adjusted pruning threshold exceeds a maximum value without the graph becoming chordal, a default grouping threshold (e.g., a grouping threshold derived from a different set of historical event data, a pruning threshold corresponding to a peak in a count of connected subgraphs, an arbitrary threshold selected by a user, or other threshold) may be applied to determine the groups of event types based on the graph. In an example, the operations may further include processing new received events based in part on the groups determined at operation 370 (e.g., using the technique 500 as described in relation to FIG. 5). In an implementation of such an example, technique 300 can be performed on a periodic basis on historical data sets, such as nightly, weekly, or monthly, and the output of technique 300 (e.g., the identified groups of event types) can be used in between the periodic performing of technique 300 to identify groupings of received events, such as in real-time, near real-time, or some other frequency greater than which technique 300 is performed. In an example, the operations may further include testing a group determined at operation 370 based on group quality metrics (e.g., using the technique 600 as described in relation to FIG. 6). Furthermore, one or more aspects of the systems and techniques described herein can be omitted.

FIG. 4 is a flowchart of a technique 400 for generating a graph based on historical event data in an electronic computing and communications system, such as the system 100 of FIG. 1. For example, the technique 400 may be used to perform operation 310 of FIG. 3. In some implementations, the technique 400 can be executed using computing devices, such as the systems, modules, and devices described with respect to FIGS. 1, 2A, and 2B. In some implementations, the technique 400 can be performed, for example, by executing a machine-readable program or other computer-executable instructions, such as instructions or programs described according to JavaScript, C, or other such instructions. The steps, or operations, of the technique 400 or any other method, process, or algorithm described in connection with the implementations disclosed herein can be implemented directly in hardware, firmware, software executed by hardware, circuitry, and/or a combination thereof.

The technique 400 for generating a graph can include partitioning at operation 410 event data from an analysis period into time intervals, adding at operation 420 vertices that are associated with event types, adding at operation 430 edges for pairs of co-occurring event types, and determining at operation 440 weights associated with edges.

For example, the graph may be generated based on historical event data. Historical event data may record events that occurred during a period of time (e.g., a day, a week, or a month), referred to herein as the analysis period. Individual events may be associated with a specific time when the event occurred. In some implementations, the analysis period is partitioned at operation 410 into multiple smaller time intervals or time windows. For example, the analysis window may be partitioned at operation 410 into many time intervals of equal duration. In some implementations, the duration of the time intervals may be configured based on an expected duration of a chain of related events (e.g., the time difference between the first event and the last event occurring in the chain of events) within a computer network environment. For example, the duration of the time intervals may be set to twice the expected duration of a chain of related events. The latency of a chain of related events is the difference in time between when a first event (e.g., a root cause event) in the chain of related events occurs and when the last event in the chain of related events occurs. In some implementations, setting the duration of the time intervals to twice the expected latency of groups of events being investigated results in about 80% of chains of events co-occurring in single interval. Some implementations may be tailored to recognize low latency groups of related events by adjusting the time interval duration used to generate the graph data.

Vertices may be added at operation 420 that are associated with event types of events in the event data being used to generate the graph. For example, events reflected in historical event data may be classified into event types from a set of event types. In some implementations, a vertex may be added at operation 420 to the graph that is associated with an event type from the set of event types that occur within the analysis period.

For a time interval within a partitioned analysis period, an event type may be said to occur in that time interval if at least one event that is classified into that event type occurs during that time interval. Two event types (e.g., Type A and Type B) may be determined to co-occur in that time interval if at least one event classified into Type A occurs in that time interval and at least one event classified into Type B occurs in that time interval.

Edges may be added at operation 430 to the graph that correspond to pairs of co-occurring event types. For example, an edge may be added at operation 430 connecting two vertices that are respectively associated with two event types that co-occur within at least one time interval of the analysis period. In some implementations, edges are added at operation 430 only for pairs of co-occurring event types. Thus, a generated graph may lack an edge connecting vertices associated with two event types that do not co-occur in any time interval of the analysis period. For example, edges may connect pairs of vertices in the graph, where each such connected pair of vertices is associated with a pair of event types for which events classified in both event types of the pair of event types have co-occurred in at least one of the time intervals. In some implementations, edges may be added at operation 430 for all pairs of event types from the set of event types that occurs within the analysis period. For example, edges corresponding to pairs of event types that do not co-occur in a time interval may be associated with a low weight (e.g., a weight of zero).

A weight may be determined at operation 440 that is associated with an edge added at operation 430 to the generated graph. For example, a weight associated with an edge may be determined at operation 440 as an estimate of the mutual information between events of two types that are associated respectively with the two vertices that the edge connects. For example, the mutual information may be estimated based on rates or counts of occurrence and co-occurrence within time intervals of the partitioned analysis period. In some implementations, a weight, associated with an edge that connects a vertex that is associated with a first event type (e.g., Type A) with a vertex that is associated with a second event type (e.g., Type B), may be determined at operation 440 based at least in part on a count (e.g., N_A) of the time intervals in which an event that is classified as Type A has occurred, a count (e.g., N_B) of the time intervals in which an event that is classified as Type B has occurred, and a count (e.g., N_AB) of the time intervals in which both an event that is classified as Type A and an event that is classified as Type B have occurred. For example, determining at operation 440 the weight may include determining a product of N_A and N_B. For example, determining at operation 440 the weight may include determining a ratio of N_AB to the product of N_A and N_B (e.g., N_AB/(N_A*N_B)). For example, determining at operation 440 the weight may include determining a logarithm of the ratio of N_AB to the product of N_A and N_B (e.g., log(N_AB/(N_A*N_B))). In some implementations, a weight may be determined at operation 440 based at least in part on a count of the time intervals in which an event has occurred. In some implementations, a weight may be determined at operation 440 based at least in part on a count of the time intervals in which an event that is classified as the first event type or the second event type has occurred. In some implementations, a weight associated with an edge may be determined at operation 440 based on an estimate of conditional probability of two event types associated with the corresponding connected vertices. For example, a weight associated with an edge connecting two vertices respectively associated with two event types (e.g., Type A and Type B) may be determined at operation 440 based on an estimate of P(A|B) and/or P(B|A), where the probabilities are estimates based on rates or counts of occurrence and co-occurrence within time intervals of the partitioned analysis period (e.g., P(A|B) may be estimated as N_AB/N_B). For example, a weight may be determined at operation 440 as an estimate of min(P(A|B), P(B|A)). For example, a weight may be determined at operation 440 as an estimate of max(P(A|P), P(B|A)). In some implementations, a weight may be determined at operation 440 based on an estimate of correlation of two event types associated with the corresponding connected vertices.

Although the technique 400 is shown as a series of operations for clarity, implementations of the technique 400 or any other method, technique, process, and/or algorithm described in connection with the implementations disclosed herein can be performed in various orders and/or concurrently. Additionally, operations in accordance with this disclosure can be performed with other operations not presented and described herein. For example, instead of adding a vertex (at operation 420) corresponding to every event type that occurs in the analysis period, vertices may be added as edges that connect those vertices are added (at operation 430) and vertices that are not connected by any edges (e.g., vertices corresponding to an event type for which no events have co-occurred with events of other event types) may be omitted from the graph. In this example there are no isolated vertices in the initial graph, which may reduce storage requirements for the graph. Furthermore, one or more aspects of the systems and techniques described herein can be omitted.

FIG. 5 is a flowchart of a technique 500 for presenting a report regarding received events based in part on groups of event types in an electronic computing and communications system, such as the system 100 of FIG. 1. For example, the technique 500 may utilize groups of event types determined at operation 370 of FIG. 3 to aggregate received events for presentation in a report. In some implementations, the technique 500 can be executed using computing devices, such as the systems, modules, and devices described with respect to FIGS. 1, 2A, and 2B. In some implementations, the technique 500 can be performed, for example, by executing a machine-readable program or other computer-executable instructions, such as instructions or programs described according to JavaScript, C, or other such instructions. The steps, or operations, of the technique 500 or any other method, process, or algorithm described in connection with the implementations disclosed herein can be implemented directly in hardware, firmware, software executed by hardware, circuitry, and/or a combination thereof.

The technique 500 can include receiving at operation 510 events from a computing network, classifying at operation 520 the events by event type, aggregating at operation 530 events by group of event types, and presenting at operation 540 a report reflecting the received events and based in part on the group(s).

Events are received at operation 510 from a computing network. For example, event data may be received at operation 510 from a computing network being managed for performance and/or security (e.g., the customer 102). In some implementations, the events may be received at operation 510 during a sliding window of time (e.g., the last 10 minutes or the last hour), which may be called a monitoring period. In some implementations, events that are deemed duplicative of another recent event of the same event type may be suppressed. For example, even though a CI may continue to repeatedly generate alerts (e.g., indicating that the CI's processor usage is >80%), there may only be one record for these repeated alerts maintained in an event monitoring and reporting system due to duplicate suppression functions. In some implementations, a repeated alert may only appear again (as a new record in the monitoring system) after the alert has been acknowledged and closed or after a system defined period of time. For example, events may be received at operation 510 via a network interface (e.g., the network communication unit 218).

Events may be classified at operation 520 by event type. For example, event data received at operation 510 may include an event identifier (e.g., identifiers indicating conditions, such as high processor usage, high disk space usage, or firewall breached), and the event may be classified at operation 520 based at least in part on the event identifier. For example, event data received at operation 510 may include a metric name (e.g., processor usage, disk space usage, or number of packets received) and the event may be classified at operation 520 based at least in part on the metric name. For example, event data received at operation 510 may include a CI identifier (e.g., a name, a MAC address, an IP address, and/or a port number), and the event may be classified at operation 520 based at least in part on the CI identifier. In some implementations, an event may be classified at operation 520 based on a combination of data fields in the event data. For example, an event may be classified at operation 520 based on a CI identifier and a metric name. For example, an event may be classified at operation 520 based on a CI type (e.g., web server, e-mail server, or database server) and a metric name. In some implementations, data specifying events is received at operation 510, where the events are classified at operation 520 into event types from a set of event types.

Events may be aggregated at operation 530 by group. For example, a count of events classified into event types that are members of a group of event types may be determined. In some implementations, entries in a report of events may be sorted based on a group or groups of event types. For example, events classified into an event type that is a member of a group of event types may be listed together (e.g., in a collapsible sub-list) in a list of events that have occurred that appears in a report.

A report, based at least in part on one or more groups of event types, may be presented at operation 540. For example, the report may be formatted based in part on one or more groups of event types. For example, the report may include data that has been aggregated at operation 530 by group of event types. In some implementations, a report is presented at operation 540 by generating and displaying a representation (e.g., text and/or plots) of a report to a user via a user interface (e.g., the user interface 220). For example, a report may be presented at operation 540 in the display region 810 of FIG. 8. In some implementations, a report is presented at operation 540 by transmitting, via a network interface (e.g., the network communication unit 218), data encoding a report to another computing device that may be configured to display the report concurrently or at a later time. For example, a report of new event data that is aggregated by group of event types, may facilitate efficient response to the reported events by helping a system administrator to understand and prioritize a potentially large number of new events.

In some implementations, a report presented at operation 540 may omit group information for events of event types where no other event type in the group has occurred during the monitoring window. For example, a system implementing the technique 500 may wait until receiving events of at least two of the event types in a group before displaying information regarding or formatted based on the group of event types.

Although the technique 500 is shown as a series of operations for clarity, implementations of the technique 500 or any other method, technique, process, and/or algorithm described in connection with the implementations disclosed herein can be performed in various orders and/or concurrently. Additionally, operations in accordance with this disclosure can be performed with other operations not presented and described herein. For example, event information aggregated by group of event types may be further sorted in accordance with a priority or severity level or ranking that is assigned to a group of event types. For example, a report may be presented at operation 540 in an interactive user interface (e.g., the user interface 220) that allows the user to provide feedback regarding the quality or usefulness of the determined at operation 370 groups of event types and/or to disable a group of event types from being used in the technique 400. Furthermore, one or more aspects of the systems and techniques described herein can be omitted.

Figure 6:
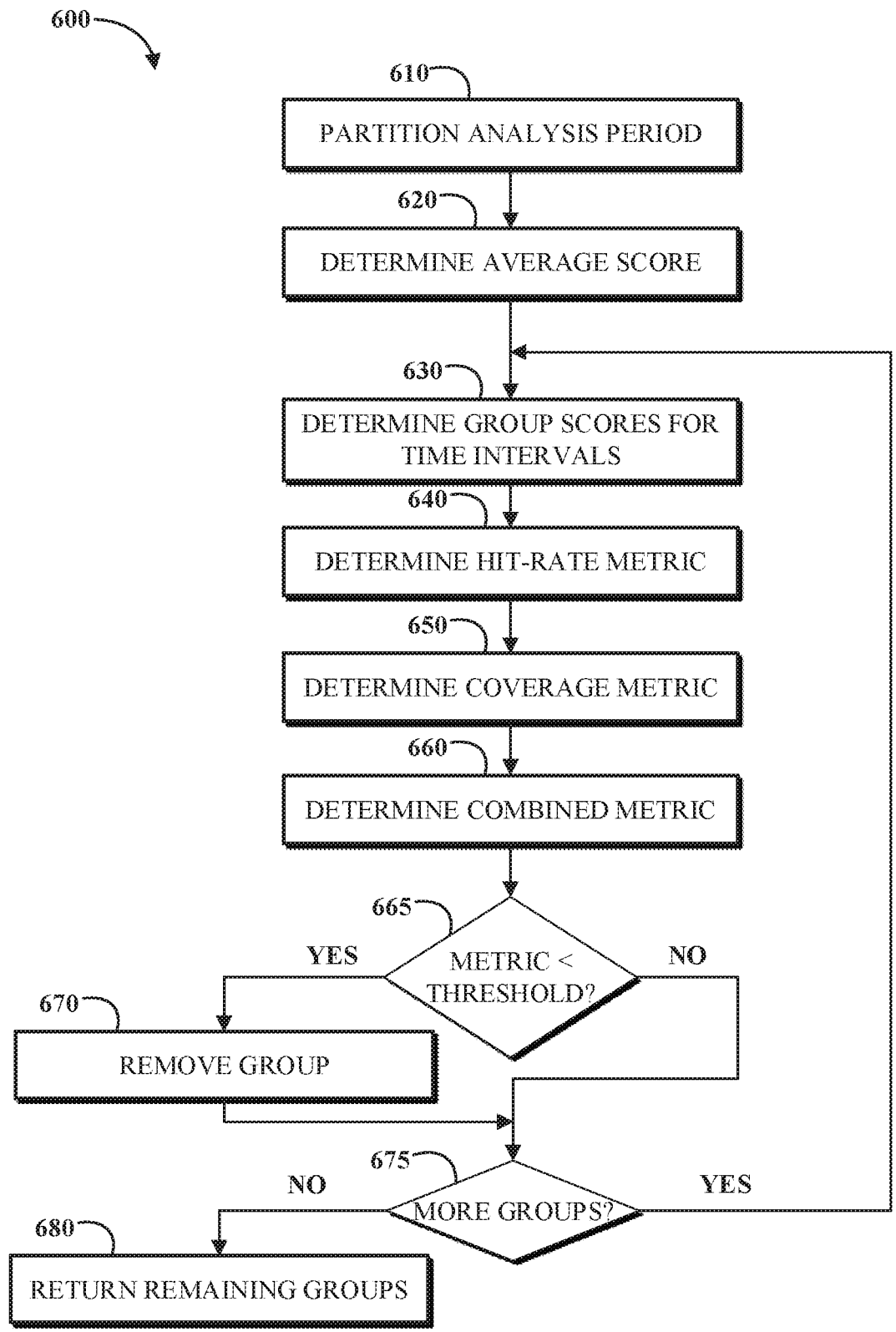
FIG. 6 is a logic flowchart illustrating an example of a technique for testing proposed groups of related event types using group quality metrics.

FIG. 6 is a flowchart of a technique 600 for testing proposed groups of related event types using group quality metrics in an electronic computing and communications system, such as the system 100 of FIG. 1. For example, the technique 600 may be used to test the quality of groups of event types determined at operation 370 of FIG. 3. In some implementations, the technique 600 can be executed using computing devices, such as the systems, modules, and devices described with respect to FIGS. 1, 2A, and 2B. In some implementations, the technique 600 can be performed, for example, by executing a machine-readable program or other computer-executable instructions, such as instructions or programs described according to JavaScript, C, or other such instructions. The steps, or operations, of the technique 600 or any other method, process, or algorithm described in connection with the implementations disclosed herein can be implemented directly in hardware, firmware, software executed by hardware, circuitry, and/or a combination thereof.

The technique 600 can include partitioning at operation 610 an analysis period, determining at operation 620 an average score for all groups of event types, determining at operation 630 group scores for time intervals, determining at operation 640 a hit-rate metric for a group, determining at operation 650 a coverage metric for a group, determining at operation 660 a combined metric for a group, removing at operation 670 a group that has a combined metric less than a threshold, and returning at operation 680 a list of remaining groups after testing using the group quality metrics.

For example, the group quality metrics may be determined based on historical event data. Historical event data may record events that occurred during an analysis period (e.g., a day, a week, or a month), where the events are classified into event types from a set of event types. Individual events may be associated with a specific time when the event occurred. In some implementations, the analysis period is partitioned at operation 610 into multiple smaller time intervals or time windows. For example, the analysis window may be partitioned at operation 610 into many time intervals of equal duration. In some implementations, the duration of the time intervals may be configured based on an expected duration of a chain of related events (e.g., the time difference between the first event and the last event occurring in the chain of events) within a computer network environment. For example, the duration of the time intervals may be set to twice the expected duration of a chain of related events.

A score for a group of event types in a time interval may be determined as being equal to a number of event types from the group occurring in the time interval divided by a total number of event types in the group. This score may be determined for a plurality of groups of event types for a plurality of time intervals. In some implementations, the score is a percentage or ratio of the number of event types in the group for which at least one event occurred in the time interval to the total number of event types in the group (e.g., if all of the event types are found→1, if half of the event types are found→0.5, or if no event types of the group are found→0). An average score may be determined at operation 620 as an average of these scores across groups and time intervals.

The scores for a group may be determined at operation 630 for the time intervals. For example, the score for a group for a time interval may be determined at operation 630 as being equal to a number of event types from the group occurring in the time interval divided by a total number of event types in the group.

A hit-rate metric may be determined at operation 640 for a group of event types. In some implementations, a hit-rate metric for a group may be determined at operation 640 as equal to a first count, of time intervals for which the score of the group is greater than the average score, divided by a second count, of time intervals for which the score of the group is greater than zero. In some implementations, a hit-rate metric for a group may be determined at operation 640 as equal to a first count, of time intervals for which the score of the group is greater than a predetermined minimum ratio (e.g., 0.3), divided by a second count, of time intervals for which the score of the group is greater than zero. For example, the hit-rate metric may be expressed as a percentage or a ratio (e.g., 0.1, 0.4, 0.5, or 0.8).

A coverage metric may be determined at operation 650 for a group of event types. In some implementations, a coverage metric for a group may be determined at operation 650 as being equal to a total number of event types in the group of event types divided by a total number of event types in the set of event types. In some implementations, the coverage metric is expressed as a percentage or a ratio (e.g., 0.01, 0.05, or 0.1).

A combined metric, based on the hit-rate metric and the coverage metric, may be determined at operation 660 for a group of event types. In some implementations, a coverage metric for a group may be determined at operation 660 as a norm (e.g., an L2 norm) of a vector with elements of the hit-rate metric for the group and the coverage metric for the group.

If at operation 665 the combined metric is less than a threshold (e.g., 0.005), then the corresponding group of event types may be removed at operation 670 from a list of groups. If at operation 675 there are more groups of event types to be considered, then the scores and metrics for those groups may be determined (at operations 630, 640, 650, and 660) and tested against the metric threshold at operation 665. Groups with metrics below the threshold may be removed at operation 670 from the list of groups. When at operation 675 there are no more groups to be considered, a list of the remaining groups may be returned at operation 680 for use to, for example, facilitate response to events occurring in a computing network.

For example, the technique 600 may be applied to evaluate or test groups of event types determined by the technique 300. This may provide an extra check on the quality of those groups before they are deployed for use with new event data (e.g., using the technique 500).

Although the technique 600 is shown as a series of operations for clarity, implementations of the technique 600 or any other method, technique, process, and/or algorithm described in connection with the implementations disclosed herein can be performed in various orders and/or concurrently. Additionally, operations in accordance with this disclosure can be performed with other operations not presented and described herein. For example, groups of event types may be tested by comparing the hit-rate metric to a threshold (e.g., 0.25) and removing groups with hit-rate metrics below the threshold. For example, groups of event types may be tested by comparing the coverage metric to a threshold (e.g., 0.02) and removing groups with coverage metrics below the threshold. For example, groups of event types may be tested by comparing an average of the non-zero scores for a group to a threshold (e.g., 0.3) and removing groups with coverage metrics below the threshold. Furthermore, one or more aspects of the systems and techniques described herein can be omitted.

Figure 7A:
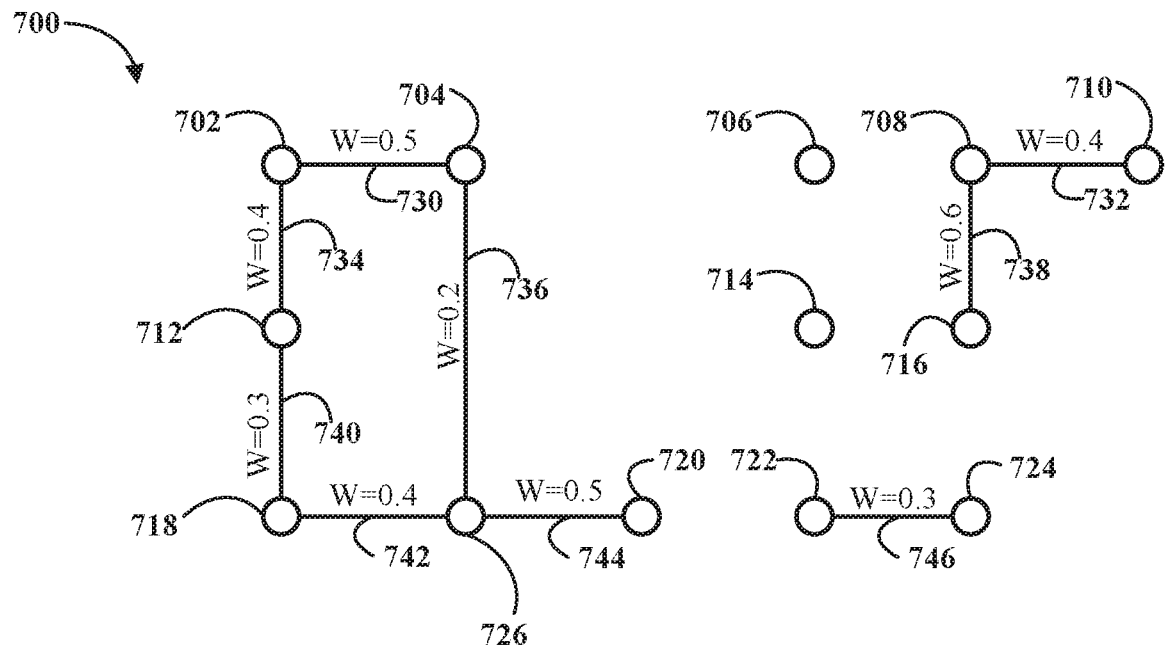
FIG. 7A is a diagram illustrating an example of a non-chordal graph.
Figure 7B:
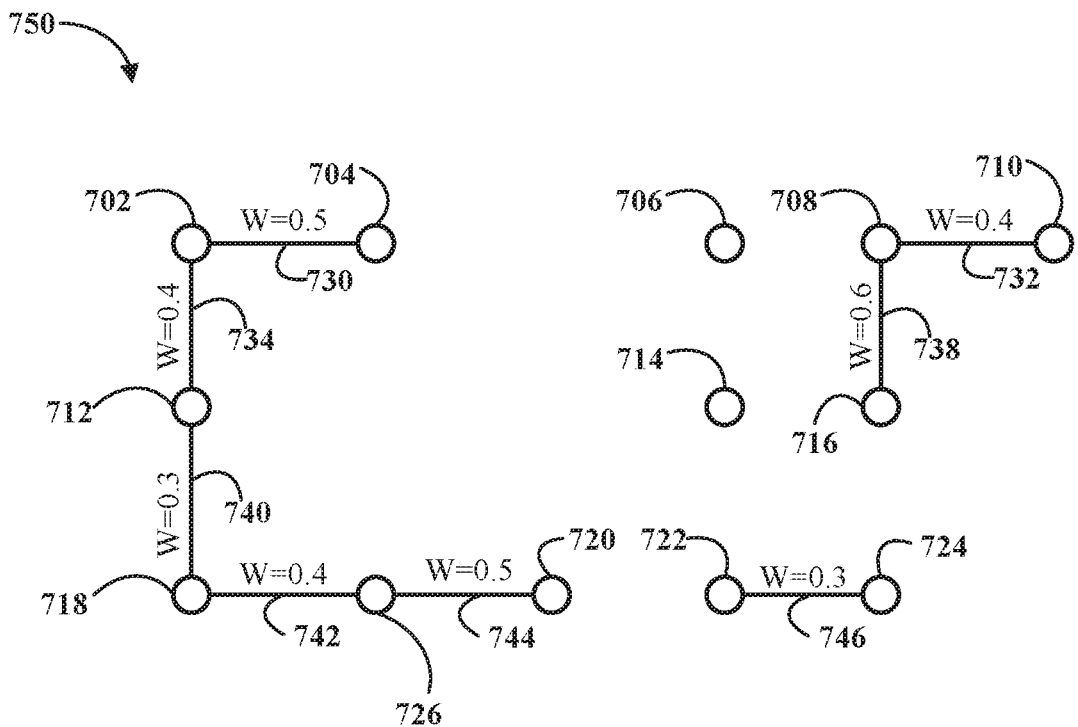
FIG. 7B is a diagram illustrating an example of a chordal graph.

FIGS. 7A and 7B illustrate an example transition of a non-chordal graph 700 to a chordal graph 750 by the application of an edge pruning operation, i.e., by removing an edge from the graph, the graph becomes chordal. The graph 700 includes thirteen vertices (702, 704, 706, 708, 710, 712, 714, 716, 718, 720, 722, 724, and 726). The graph 700 also includes nine edges (730, 732, 734, 736, 738, 740, 742, 744, and 746) that have associated weights shown in FIG. 7A (e.g., the weight associated with the edge 730 is 0.5). The graph 700 is non-chordal because vertices 702, 704, 726, 718, and 712 along with edges 730, 736, 742, 740, and 734 form a cycle of more than three vertices (i.e., five vertices in this example) for which there is no chord. A chord is an edge, that is not part of a cycle, that connects two of the vertices in the cycle. The graph 700 includes three connected subgraphs, which respectively include at least two vertices and are disconnected from other vertices in the graph 700: the connected subgraph A includes vertices 702, 704, 712, 718, 720, and 726; the connected subgraph B includes vertices 708, 710, and 716; and the connected subgraph C includes vertices 722 and 724. The graph 700 also includes isolated vertices 706 and 714, which have no edges. While an isolated vertex may be considered a connected subgraph, in some implementations, isolated vertices are not counted as connected subgraphs for the purpose of determining groups of related event types associated with corresponding vertices in the graph 700.

An edge pruning operation (e.g., as discussed in relation to the technique 300 of FIG. 3) may be applied to the graph 700 of FIG. 7A, which may result in the graph 750 of FIG. 7B. For example, a pruning threshold of 0.25 may be applied to remove the edge 736, which has the lowest weight (i.e., W=0.2) in the graph 700. After the edge 736 is removed by the pruning operation, the resulting graph 750 is chordal, because there is no cycle of more than three vertices in the graph 750. In this example, the connected subgraphs are the same in the graph 750 as they were in the graph 700. For example, in response to a determination that the graph 750 is chordal, the connected subgraphs A, B, and C may be identified and groups of event types may be determined that include: event types associated with the vertices 702, 704, 712, 718, 720, and 726 may be included in a group A; event types associated with the vertices 708, 710, and 716 may be included in a group B; and event types associated with the vertices 722 and 724 may be included in a group C. For example, event data from some computing networks (e.g., customer 102) may result in a graph that includes thousands of vertices corresponding to different types of events occurring in the computing network during an analysis period.

Figure 8:
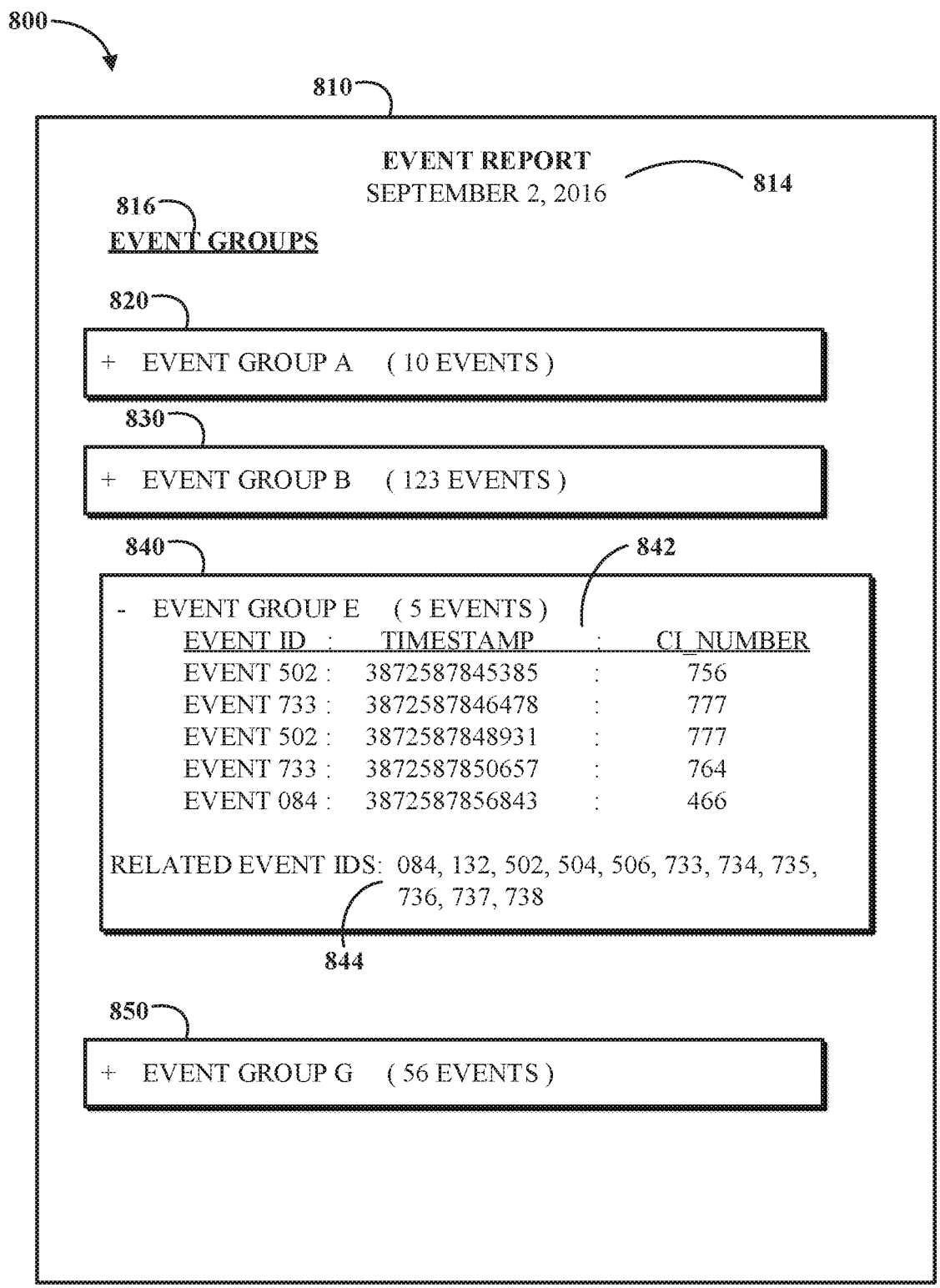
FIG. 8 is a diagram of an example display region generated for presenting a report based on event data and groups of related event types.

FIG. 8 is a diagram 800 of an example display region 810 generated for presenting 540 a report based on event data and groups of related event types. The display region 810 may be generated for displaying groups of event types based on the groups of event types determined at 370. The display region 810 can include, for example, information relating to the groups of event types for monitoring by a user or a system administrator, for management of computer system events and to enable user feedback and supervision. The display region 810 may be generated in response to a user intervention, such as an interface with a graphical user interface (e.g., the user interface 220). However, in certain circumstances and implementations, the display region 810 may be triggered automatically.

The display region 810 may include a title and date 814, a heading 816, and a list of groups 820, 830, 840, and 850 for which events have been received in a monitoring period (e.g., an hour, a day, or a week). For example, a top-level listing for a group of event types may indicate the name of a group and the number of events of types in that group that have occurred in the monitoring window (e.g., the group listing 830 indicates that one hundred twenty-three events have occurred for "EVENT GROUP B"). In some implementations, the group listings may be expandable and collapsible. For example, the group listing 840 has been expanded to display information 842 about events that have occurred for the group of event types named "EVENT GROUP E". The displayed event information 842 may include an identifier of the event type (e.g., the "EVENT ID"), a timestamp indicating when an event occurred, and a CI identifier (e.g., a "CI NUMBER"). The group listing 830 also displays a list 844 of the event types that are members of the corresponding group of event types. For example, the event types corresponding to "EVENT IDS" 084, 132, 502, 504, 506, 733, 734, 735, 736, 737, and 738 are members of the group of event types named "EVENT GROUP E." In this manner, the event data from a monitoring period may be aggregated using groups of event types to facilitate review and response by a network administrator responsible for managing the subject computing network.

Figure 9:
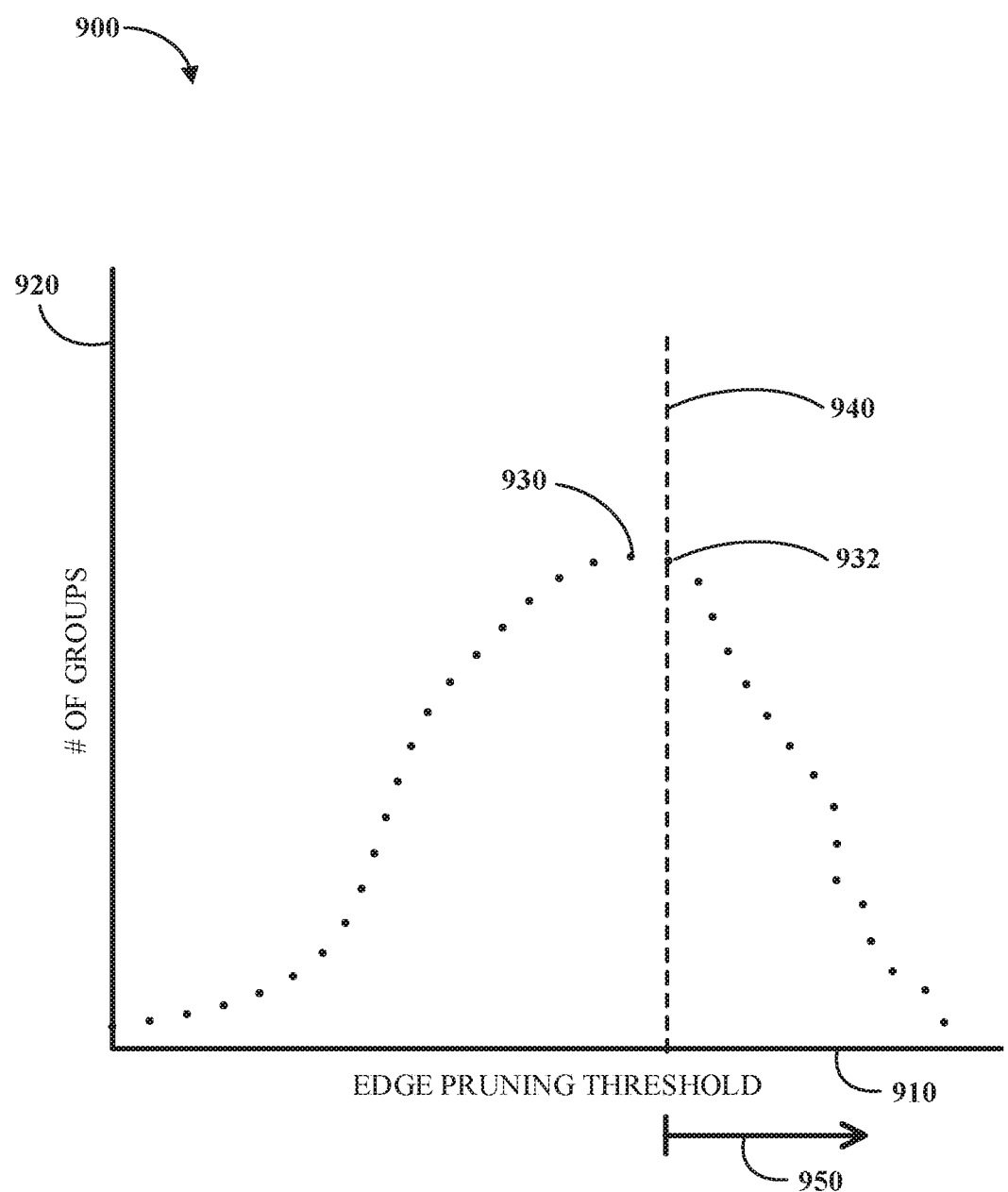
FIG. 9 is an example plot of a number of groups of event types identified based on a graph of historical event data vs an edge pruning threshold applied.

FIG. 9 is an example plot 900 of a number of groups of event types identified based on a graph of historical event data vs an edge pruning threshold applied. The plot 900 reflects that, for an example graph generated based on historical event data from a computing network, as the edge pruning threshold is increased along the x-axis 910, the number of groups determined at operation 370 using the edge pruning threshold (shown on the y-axis 920) rises until it reaches a peak 930 and begins to fall. For example, groups determined at operation 370 using a pruning threshold greater than or equal to a pruning threshold value corresponding to the peak 930 may have high quality in the sense of identifying useful relationships between event types within the groups and/or providing a good level of coverage of the set of event types occurring in the computing network. In some implementations, the peak 930 may be detected at operation 345 when the pruning threshold is increased at operation 320 to value 940 and a count 932 of connected subgraphs is determined at operation 340 to have decreased compared to a previous count of connected subgraphs. For example, the count 932 and the pruning threshold value 940 may be determined at operation 345 to correspond to the peak 930. For example, a range 950 of pruning thresholds that are greater than or equal to the corresponding value 940 may be searched to find a grouping threshold. In an implementation, a grouping threshold is found by testing edge pruning in the range 950 to avoid edge pruning thresholds less than the value 940 corresponding to the peak that may generate a graph that is trivially chordal.

This two stage process to select a grouping threshold may be beneficial. In the first stage a range of pruning thresholds corresponding to groups of strongly related event types is found. In the second stage, this range of pruning values is searched using a chordal test to select a grouping threshold from within this range.

In a cloud computing environment, large amounts of nodes are interconnected, with many applications and services running on them. For example, when a CI has a metric exceeding a threshold, an alert can be sent to a system administrator. Considering the amount of the nodes, applications, services, and time intervals, the amount of the resulting events are prone to trigger information overload for a network administrator. Therefore, a method for event aggregation may be helpful.

The events can be aggregated and presented in groups, with a group indicating a correlation between the included events. The grouping or categorizing for the events relies on event patterns. Various methods can be used to extract such event patterns, such as avalanche detection and conditional probability graph (CPG). In the CPG method, a type of event is associated with a node in the CPG. The edges between a pair of CPG vertices can be determined from conditional probability, thus making the CPG a directional graph. To reduce misleading categorization, of CPG vertices, bi-directional conditional probabilities for the same edge may be calculated (e.g., $P(A|B)$ and $P(B|A)$). An edge threshold requiring a minimum conditional probability (bi-directional) may be applied to remove some of the edges, decomposing the CPG into sub-CPGs. An edge count (EC) parameter may be set to limit the edges not less than a minimum number for a sub-CPG. In some implementations, a resulting sub-CPG can be used as an event group, with the included vertices (associated event types) considered correlated.

In some implementations, events are associated with vertices of a graph and the graph may be built as follows. Whenever a new event occurs, it can be added into the graph as a new vertex. Then, for all combinations between the newly added vertex and an existing vertex, a mutual information can be estimated. For example, mutual information may be a measure of the mutual dependence between two variables, such as the occurrence of events of two event types. The mutual information between to random variables X and Y, I(X; Y), is defined as follows:

$$I(X; Y) = \sum_{y \in Y} \sum_{x \in X} p(x, y) \log\left(\frac{p(x, y)}{p(x)p(y)}\right)$$

In some implementations, as events are added into the graph as associated vertices, new edges between the new vertex and other vertices are also added and associated with weights based on estimates of mutual information between events of the event types respectively associated with the connected vertices. In some implementations, a fully-connected graph can be generated in this manner and named as mutual information graph (MIG). Mutual information does not have directional dependence, thus can reduce the calculation between vertices compared to conditional probabilities.

All or a portion of aspects of the systems and methods described herein can be implemented using a multi-purpose computer/processor with a computer program that, when executed, carries out any of the respective techniques, algorithms and/or instructions described herein. In addition, or alternatively, for example, a special-purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations described or claimed herein. An example FPGA can include a collection of logic blocks and random access memory (RAM) blocks that can be individually configured and/or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The embodiments disclosed herein can be described in terms of functional block components and various processing operations. Such functional block components can be realized by any number of hardware and/or software components that perform the specified functions. For example, the described embodiments can employ various integrated circuit components (e.g., memory elements, processing elements, logic elements, look-up tables, and the like), which can carry out a variety of functions under the control of one or more microprocessors or other control devices. Similarly, where the elements of the described embodiments are implemented using software programming or software elements, the systems and methods can be implemented with any programming or scripting language, such as C, C++, Java, assembler, or the like, with the various algorithms being implemented with any combination of data structures, objects, processes, routines, or other programming elements. Functional aspects can be implemented in algorithms that execute on one or more processors. Furthermore, the embodiments of the systems and methods could employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained within the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or "one implementation" throughout this application is not intended to mean the same embodiment or implementation unless described as such.

The particular implementations shown and described herein are illustrative examples of the systems and methods and are not intended to otherwise limit the scope of the systems and methods in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships and/or physical or logical couplings between the various elements. Many alternative or additional functional relationships, physical connections, or logical connections can be present in a practical device.

The use of the terms "including," "comprising," "having," and variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a," "an," "the," and similar referents in the context of describing the systems and methods (especially in the context of the following claims) should be construed to cover both the singular and the plural. Furthermore, unless otherwise indicated herein, the recitation of ranges of values herein is intended merely to serve as a shorthand alternative to referring individually to separate values falling within the range, and the separate values are individually incorporated into the specification as if they were individually recited herein. Finally, the operations of all methods described herein are performable in any suitable order unless otherwise indicated herein or clearly indicated otherwise by the context. The use of any and all examples, or language suggesting that an example is being made (e.g., "such as"), provided herein is intended merely to better illuminate the systems and methods and does not pose a limitation on the scope of the systems and methods unless otherwise claimed.

All references, including publications, patent applications, and patents, cited herein are hereby incorporated by reference to the same extent as if each individual reference were individually and specifically indicated as incorporated by reference and were set forth in its entirety herein.

The above-described embodiments have been described in order to facilitate easy understanding of the present systems and methods, and such descriptions do not limit the present systems and methods. To the contrary, the systems and methods are intended to cover various modifications and equivalent arrangements included within the scope of the appended claims, which scope is to be accorded the broadest interpretation as is permitted under the law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
    a processor; and
    a memory, accessible by the processor, the memory storing instructions, that when executed by the processor, cause the processor to perform operations comprising:
        determining a plurality of event types based on historical event data associated with a computing network;
        calculating a correlation between each event type of the plurality of event types based on an amount of mutual information between an event of each event type and an event of each other event type of the plurality of event types;
        determining one or more sets of event types of the plurality of event types by dynamically adjusting a threshold degree of correlation between the plurality of event types in real-time until a peak number of sets of event types is determined, wherein each event type of a particular set of event types of the one or more sets of event types has a respective correlation with at least one other event type of the particular set of event types greater than the threshold degree of correlation;
        receiving event data associated with a plurality of events occurring within the computing network;
        aggregating the event data into respective event types and respective sets of event types based on the determined one or more sets of event types; and
        transmitting the aggregated event data to a display device for display.

2. The system of claim 1, wherein aggregating the event data comprises aggregating the event data into the respective event types and the peak number of sets of event types.

3. The system of claim 1, wherein determining the one or more sets of event types comprises generating a graph including a plurality of vertices and a plurality of edges based on the historical event data, wherein each vertex of the plurality of vertices is associated with an event type of the plurality of event types and each edge of the plurality of edges is associated with a weight of the correlation between a respective event type and another event type.

4. The system of claim 1, wherein the historical event data is associated with one or more time intervals, and wherein the operations comprise:
    determining a respective score associated with each time interval of the one or more time intervals for each set of event types, wherein the respective score is indicative of a percentage of a total number of event types in the set of event types that have at least one event associated with an event type of the set of event types occurring during the time interval.

5. The system of claim 4, wherein the one or more sets of event types comprises a plurality of sets of event types, and wherein the operations comprise:
    removing a particular set of event types from the plurality of sets of event types in response to the respective score for the particular set of event types being less than a threshold value.

6. The system of claim 1, wherein transmitting the aggregated event data to the display device for display comprises presenting the aggregated event data in a report formatted based on the respective sets of event types and the respective event types.

7. The system of claim 6, wherein the report comprises a respective header for each set of event types of the respective sets of event types that indicates a name of the set of event types and a quantity of events associated with the set of event types, and displays a list of event types associated with the set of event types.

8. A method, comprising:
- receiving, via one or more processors, historical event data associated with a computing network during a first time period;
- determining, via the one or more processors, a plurality of event types based on the historical event data received during the first time period;
- calculating, via the one or more processors, a correlation between each event type of the plurality of event types based on an amount of mutual information between an event of each event type and an event of each other event type of the plurality of event types;
- determining, via the one more processors, one or more sets of event types of the plurality of event types by dynamically adjusting a threshold degree of correlation between the plurality of event types in real-time until a peak number of sets of event types is determined, wherein each event type of a particular set of event types of the one or more sets of event types has a respective correlation with at least one other event type of the particular set of event types greater than the threshold degree of correlation;
- storing, via the one or more processors, data specifying the one or more sets of event types;
- receiving, via the one or more processors, event data associated with the computing network during a second time period;
- aggregating, via the one or more processors, the event data received during the second time period into respective event types and respective sets of event types based on the determined one or more sets of event types; and
- transmitting, via the one or more processors, the aggregated event data to a display device for display.

9. The method of claim 8, wherein the respective correlation of each event type with at least one other event type is indicative of a co-occurrence between at least one event of the event type and at least one event of the at least one other event type.

10. The method of claim 8, wherein aggregating, via the one or more processors, the event data comprises aggregating, via the one or more processors, the event data into the respective event types and the peak number of sets of event types.

11. The method of claim 8, wherein determining, via the one or more processors, the one or more sets of event types comprises generating, via the one or more processors, a graph including a plurality of vertices and a plurality of edges based on the historical event data, wherein each vertex of the plurality of vertices is associated with an event type of the plurality of event types and each edge of the plurality of edges is associated with a weight of the correlation between a respective event type and another event type.

12. The method of claim 11, wherein determining, via the one or more processors, the one or more sets of event types comprises removing one or more edges of the plurality of edges from the graph based on the weight of the correlation being less than a weight associated with the threshold degree of correlation.

13. The method of claim 8, wherein transmitting, via the one or more processors, the aggregated event data to the display device for display comprises presenting the aggregated event data in a report formatted based on the respective sets of event types and the respective event types.

14. A non-transitory, computer-readable storage medium, comprising instructions that when executed by one or more processors, cause the one or more processors to perform operations comprising:
- receiving historical event data associated with a computing network;
- determining a plurality of event types based on the historical event data;
- calculating a correlation between each event type of the plurality of event types based on an amount of mutual information between an event of each event type and an event of each other event type of the plurality of event types, wherein the correlation is indicative of a co-occurrence between the event of each event type and the event of each other event type;
- determining one or more sets of event types of the plurality of event types by dynamically adjusting a threshold degree of correlation between the plurality of event types in real-time until a peak number of sets of event types is determined, wherein each event type of a particular set of event types of the one or more sets of event types has a respective correlation with at least one other event type of the particular set of event types greater than the threshold degree of correlation;
- receiving event data associated with a plurality of events occurring within the computing network, wherein the event data comprises one or more alerts;
- aggregating the event data into respective event types and respective sets of event types based on the determined one or more sets of event types; and
- activating one or more auto-remediation measures based on the aggregated event data to resolve the one or more alerts.

15. The non-transitory computer-readable storage medium of claim 14, wherein aggregating the event data comprises aggregating the event data into the respective event types and the peak number of sets of event types.

16. The non-transitory computer-readable storage medium of claim 14, wherein determining the one or more sets of event types comprises generating a graph including a plurality of vertices and a plurality of edges based on the historical event data, wherein each vertex of the plurality of vertices is associated with an event type of the plurality of event types and each edge of the plurality of edges is associated with a weight of the correlation between a respective event type and another event type.

17. The non-transitory computer-readable storage medium of claim 14, the operations comprising transmitting the aggregated event data to a display device for display in a report formatted based on the respective sets of event types and the respective event types.

* * * * *